J. CLEVELAND.
FRAME SQUARING TOOLS.

No. 181,411.                    Patented Aug. 22, 1876.

WITNESSES:
John Goethals
Chas Laurcott

INVENTOR:
J. Cleveland
BY
ATTORNEYS.

UNITED STATES PATENT OFFICE.

JEROME CLEVELAND, OF TECUMSEH, MICHIGAN, ASSIGNOR OF ONE-FOURTH HIS RIGHT TO OTIS W. BEAN, OF SAME PLACE.

IMPROVEMENT IN FRAME-SQUARING TOOLS.

Specification forming part of Letters Patent No. 181,411, dated August 22, 1876; application filed June 26, 1876.

*To all whom it may concern:*

Be it known that I, JEROME CLEVELAND, of Tecumseh, in the county of Lenawee and State of Michigan, have invented a new and Improved Frame-Squaring Tool, of which the following is a specification:

My invention consists of a bar with two heads on it, one or both being adjustable, and having a clamp-screw for fastening at any point, the said heads being adapted to fit in the corners of a square door, window, or other frame, when the bar extends across it diagonally, and hold the frame square until stay-braced, the heads being first set at the proper distance apart for so holding the frame, thus enabling the squaring of such frame to be effected with less labor and time than are required in the common way, which consists of taking the measures of both diagonals of the frame in its "racked" or unsquare state, and then truing the frame to the mean between the two measures, and holding it by hand until stay-braced, which requires generally one person to hold the frame, while the other manages the measure and nails on the stay-brace; whereas with this improved tool one person can do the whole without difficulty.

Figure 1:
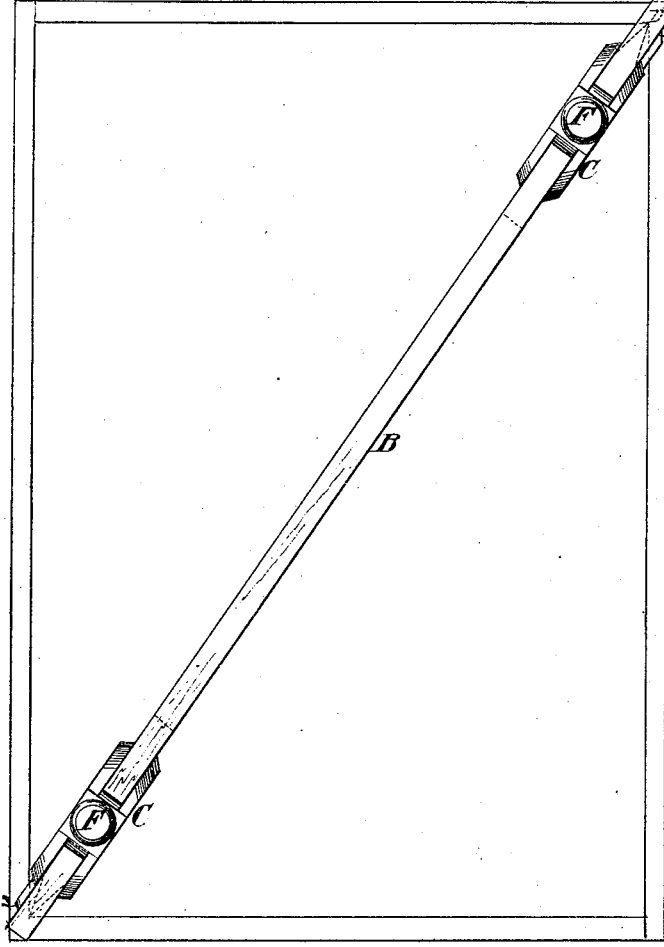
Figure 2:
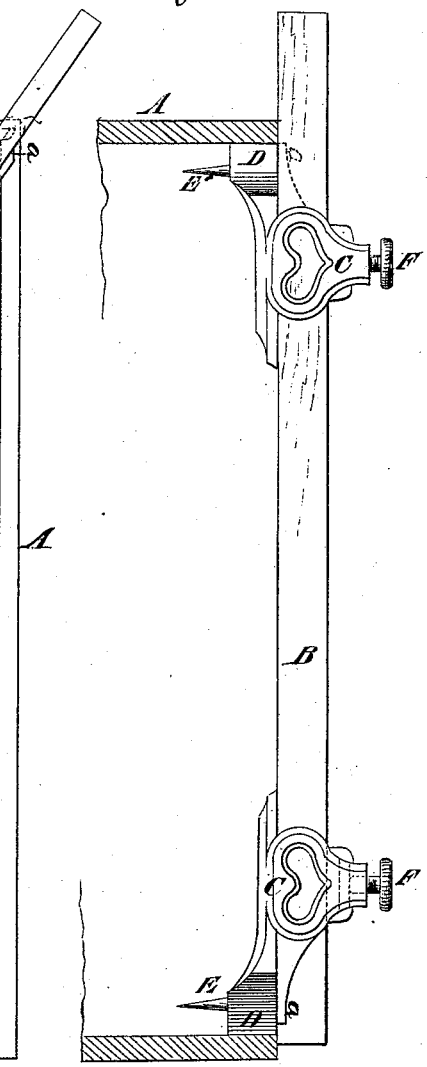

Figure 1 is a front elevation of a frame and a squaring-tool, contrived according to my invention ; and Fig. 2 is a section of the frame, and side elevation of the tool.

Similar letters of reference indicate corresponding parts.

A is the frame to be squared; B, the bar, and C the heads of the tool for squaring it. The said heads are slotted to adapt them to slide on the bar B, and provided with screws F for clamping them in any desired adjustment. Each head C has an extension or indicator, *a*, and a beveled point, D, is formed on its under side, as shown, Fig. 2.

The implement is used in this manner: The bar B is laid diagonally across the window or other frame A to be squared, as in Fig. 1, and one of the heads C is then moved along the said bar till its beveled point D enters the angle of the frame, when the head is secured by its clamp-screw F. The other head C is then adjusted along the bar B till its point D similarly abuts the frame at its diagonally-opposite angle. A pencil-mark is then made at the end of the indicator-bar *a*, and said mark will be directly over the apex of the angle of the frame. The implement is next removed, and the measurement of the frame A taken on the other diagonal, and a mark made, as before, at the end of indicator *a*. If the frame is not square the two pencil-marks will not coincide, and the mean of the distance between them is the point to which one of the heads C requires to be adjusted to indicate the proper length of each diagonal. The implement is then allowed to remain in the position shown in Fig. 2, and the frame A held adjusted to the same as a gage, while a stay or brace is being nailed to it to retain it in the square. I show the heads C provided with points E, whereby the tool is adapted for sweeping circles.

Having thus described my invention, I claim as new and desire to secure by Letters Patent—

The improved tool for squaring frames, consisting of a bar, B, and heads C, having beveled or angular ends E, and an indicator, *a*, said heads being adjustable, as shown and described, for the purpose specified.

JEROME CLEVELAND.

Witnesses:
ALBERT D. LAWRENCE,
CHARLES BURRIDGE.